United States Patent
Rosen et al.

(10) Patent No.: US 7,336,372 B2
(45) Date of Patent: Feb. 26, 2008

(54) NONINVASIVE OPTICAL IMAGING BY SPECKLE ENSEMBLE

(75) Inventors: Joseph Rosen, Omer (IL); David Abookasis, Irvine, CA (US)

(73) Assignee: Zvi Yaniv, Austin, TX (US)

( * ) Notice: Subject to any disclaimer, the term of this patent is extended or adjusted under 35 U.S.C. 154(b) by 30 days.

(21) Appl. No.: 11/226,572

(22) Filed: Sep. 14, 2005

(65) Prior Publication Data

US 2006/0055772 A1    Mar. 16, 2006

Related U.S. Application Data

(60) Provisional application No. 60/609,643, filed on Sep. 14, 2004.

(51) Int. Cl.
    *G01B 11/02*    (2006.01)
(52) U.S. Cl. .................................................... 356/515
(58) Field of Classification Search ................ 356/124, 356/124.5, 125, 126, 127, 456, 515
    See application file for complete search history.

(56) References Cited

U.S. PATENT DOCUMENTS 6,631,001 B2 * 10/2003 Kuiseko ..................... 356/456

OTHER PUBLICATIONS

Abookasis, David et al. "NOISE 2 imaging system: seeing through scattering tissue with a reference point". Optics Letters, vol. 29, No. 9, May 1, 2004, pp. 956-958.*
Rosen, Joseph et al. "Seeing through biological tissues using the fly eye principle". Optics Express, vol. 11, No. 26, Dec. 29, 2003, pp. 3605-3611.*
Abookasis, David et al. "Reconstruction objects hidden in scattering medium using microlens array". Proceedings of SPIE, vol. 5557, Oct. 2004, pp. 70-78.*

* cited by examiner

*Primary Examiner*—Michael A. Lyons
(74) *Attorney, Agent, or Firm*—Fish & Richardson P.C.; Kelly Kordzik

(57) ABSTRACT

A fly-eye-like imaging system for seeing objects embedded in scattering media. Objects are recovered from many speckled images observed by a digital camera through a microlens array. Each microlens in the array generates a speckle image of the object buried between two layers of chick breast tissue. In the computer, each image is Fourier transformed jointly with an image of the speckled pointlike source captured under the same conditions. A set of the squared magnitudes of the Fourier-transformed pictures is accumulated to form a single average picture. This final picture is again Fourier transformed, resulting in the reconstruction of the hidden object.

7 Claims, 5 Drawing Sheets ately, on the average, to constant functions, and thus the summation of channels should yield the desired image. However, in practice there is only a finite number of microlenses in the MLA.

NONINVASIVE OPTICAL IMAGING BY SPECKLE ENSEMBLE

This application claims priority to U.S. Provisional Patent Application Ser. No. 60/609,643, filed Sep. 14, 2004.

TECHNICAL FIELD

The present invention relates in general to imaging systems, and in particular, to a system for imaging a hidden object.

BACKGROUND INFORMATION

In recent years, much effort has been devoted to research in the optical imaging of objects embedded in a scattering medium. This topic has many potential applications, such as in medical diagnostics since it is safe, noninvasive, and relatively inexpensive compared with other often-used tomography techniques. Different optical imaging techniques have been proposed, each of which has advantages and weaknesses.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The present invention is for a new scheme for imaging through a scattering medium. This scheme, inspired by stellar speckle interferometry, is termed noninvasive optical imaging by speckle ensemble (NOISE). It is based on an optical imaging system containing a microlens array (MLA) that images a hidden object through different parts of a scattering medium. The Earth's atmosphere is a well-investigated scattering medium. Stellar speckle interferometry, a method of imaging through the atmosphere, was invented more than 30 years ago by Labeyrie. In this method, after many short-exposure photographs are collected, the square magnitude of the Fourier transform of each image is computed and accumulated to a single average power spectrum. However, the square magnitude lacks phase information, and in the end one can obtain only the average autocorrelation of the object function rather than its true shape. There is a space-time analogy between the temporal situation of Labeyrie's speckle interferometry and spatial NOISE. In the former, different speckled images are collected over time, with the atmospheric turbulence changing from one frame to another. On the other hand, in the case of NOISE the scattering medium is static. To collect different blurred images of the object through different scattering layers, the object should he observed from unrelated spatial parts of the same scattering medium. This goal is achieved by use of a MLA, with each lens in the array imaging from the same object through a different part of the scattering layer. However, unlike in the case of astronomical observation, the embedded object is illuminated from outside the medium with coherent light. Moreover, the speckled patterns are processed in the image plane rather than in the Fourier plane. Therefore the output result is an image of the object itself and not its autocorrelation.

In this last sense, the present invention is closer to another speckle interferometry technique termed the shift-and-add algorithm. Other related works deal with optical speckle tomography of biological tissues under ultrasound scanning. Since the ultrasound radiation modulates the optical speckle pattern, these technique provides dynamic analysis of speckle patterns.

Figure 1:
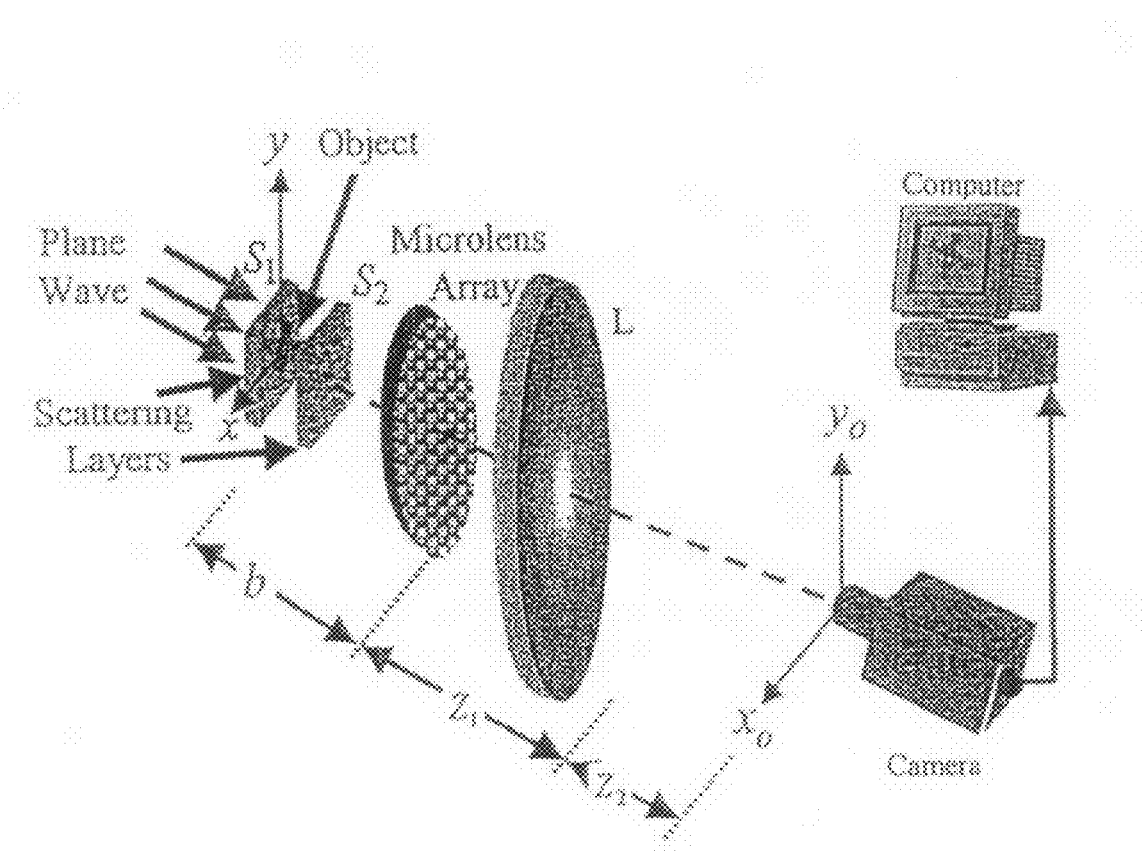
FIG. 1 illustrates a system configured in accordance with an embodiment of the present invention.

Referring to FIG. 1, the hidden object (a cross) is illuminated from the rear by a plane wave. (The hidden object is represented herein as cross-shaped or V-shaped; but could be an object of any shape.) Each individual lens in the microlens array MLA and spherical lens L operate in succession as two separate imaging systems. Without the scattering layers ($S_1,S_2$), the coherently illuminated system is characterized by a relatively narrow point-spread function (PSF) $h_0(x, y)$. This PSF is calculated conventionally as an inverse Fourier transform of the aperture of a single microlens. In this case, the microlens imposes the limit on the system bandwidth because its numerical aperture is smaller than that of lens L.

Figure 2:
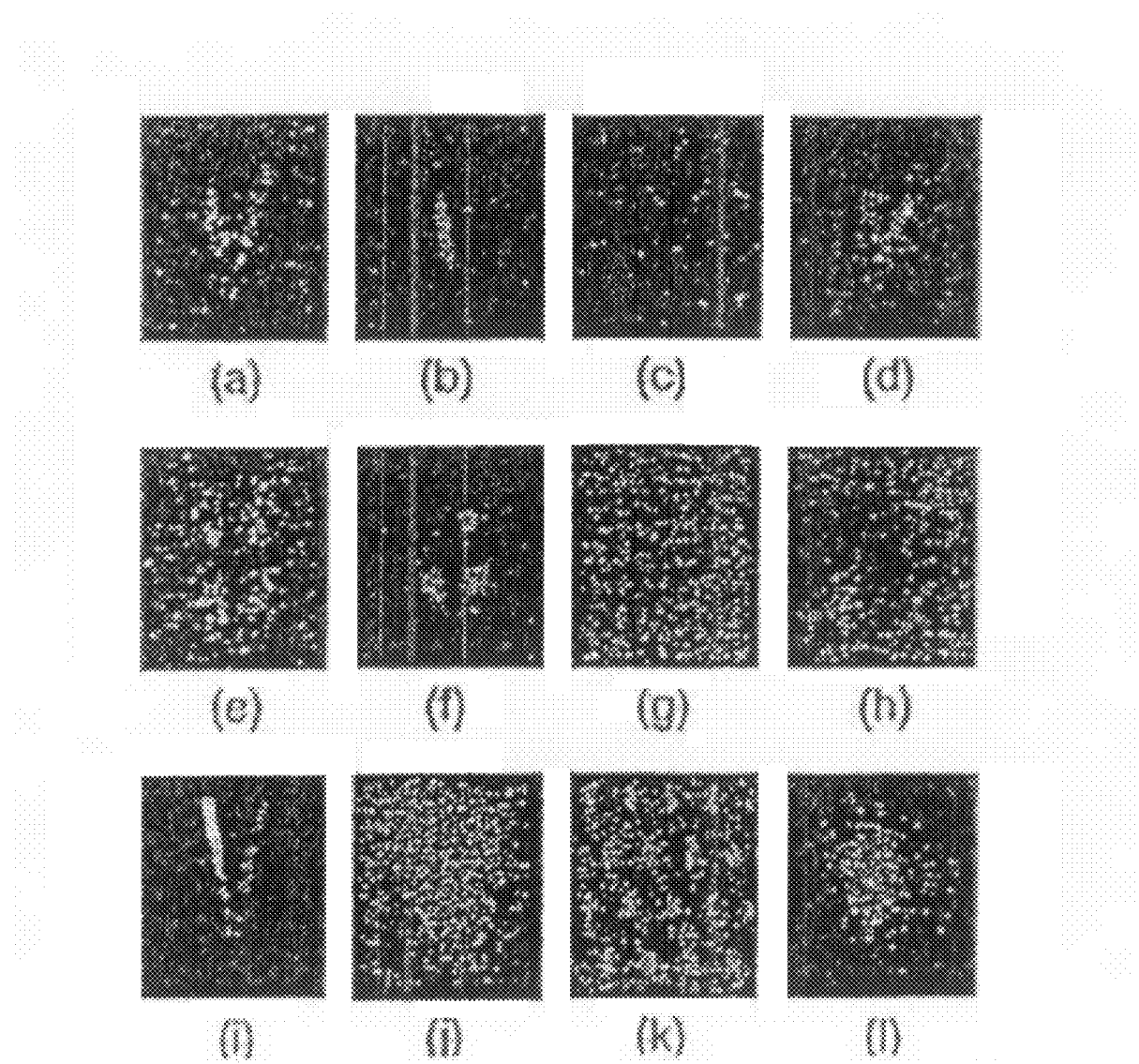
FIG. 2(a) illustrates a digital image of the letter V in a single channel without scattering layer $S_2$.
FIG. 2(b) illustrates an average picture of the entire array when the letter V is positioned in front of the scattering layer S, and scattering layer $S_2$ is removed.
FIG. 2(c) illustrates several speckled pictures recorded by the CCD camera when the letter V was embedded between the two scattering layers.
FIG. 2(d) illustrates a final reconstructed result obtained from averaging 132 different imaging channels.
FIGS. 2(e)-(h) illustrate images similar to those in FIGS. 2(a)-(d), but for an object in the shape of an x or cross.
FIG. 2(i) illustrates a white-light image of the letter V in a single channel without the scattering layer S2.
FIG. 2(j) illustrates a white-light image of the letter V in a single channel, captured through scattering layer S2.
FIG. 2(k) illustrates several pictures recorded by the CCD camera when the letter V was embedded between the two scattering layers and illuminated by a broad white-light source.
FIG. 2(l) illustrates a result obtained from averaging white-light images from 132 different channels.

Next, consider the effect of backscattering layer $S_1$. This layer diffuses the light such that each microlens in MLA receives almost the same amount of illumination. In addition, because of the randomness of medium $S_1$ and its uniformity, the object is multiplied by a random phase function with almost constant magnitude. Examples of such images are shown in FIGS. 2(a) and 2(e). Up to this point, the entire system could be modeled as an array of several identical imaging systems, all with the same PSF given by $h_o(r)$, where $r=(x, y)$. Each imaging channel has an input function $t(r)=A(r)\cdot\exp[j\phi(r)]$, where $A(r)$ is the object amplitude function and $\phi(r)$ is a random phase function induced by layer $S_1$. The image intensity at the kth coherently illuminated channel is given by $$I(r_o)=|t(r_o)*h_o(r_o)|^2 \quad (1)$$

where the asterisk denotes two-dimensional convolution and $r_o=(x_o, y_o)$. $I(r_o)$ of Eq. (1) is the diffraction-limited image of the squared function of the object, $|A(r_o)|^2$. The goal of the following proposed procedure is to produce an intensity distribution that is as close as possible to $I(r_o)$.

Referring again to FIG. 1, when the front scattering layer $S_2$ is introduced into the system, the output image is distorted such that the object cannot be recognized. Since each microlens observes the object through a different transverse cross-section of the scattering layer, each kth microlens, together with lens L, creates a linear system characterized by a different random PSF $h_k(r)$. Therefore, the output intensity pattern in each coherently illuminated kth channel is given by $I_k(r_o)=|t(r_o)*h_k(r_o)|^2$. It is assumed that, although each PSF $h_k(r)$ is a random function that is wider than $h_o(r)$, the ensemble average PSF over all K channels satisfies the relation $$\frac{1}{K}\sum_k h_k(r) \cong h_o(r). \quad (2)$$

Having the set of K speckled images $\{I_k(r_o)\}$, each one of them is first centered and then summed to a single average image given by $$S(r_o) = \frac{1}{K}\sum_k |t(r_o)*h_k(r_o)|^2 \quad (3)$$

To show that this ensemble average is approximately equal to the diffraction-limited image given by Eq. (1), the convolution of Eq. (3) is explicitly written, and the order of integration and summation is interchanged as follows:

$$S(r_o) = \int_{-\infty}^{\infty}\int_{-\infty}^{\infty} t(r_1)t*(r_2)\left[\frac{1}{K}\sum_k h_k(r_o-r_1)\times h_k^*(r_o-r_2)\right]dr_1 dr_2, \quad (4)$$

where the superscript asterisk denotes the complex conjugate. The internal averaging in Eq. (4) can be separated into two summations, one includes all the pairs of functions $h_k(r)$ shifted by different distances, i.e., $r_1 \neq r_2$. The ensemble average in this case is calculated by the multiplication of two uncorrelated random variables, and hence this ensemble average is equal to the multiplication of their ensemble averages. The second summation represents all the pairs of function shifted equally, i.e., $r_1=r_2$. This latter sum is the ensemble average on the set of random functions $\{|h_k(r)|^2\}$, which based on Eq. (2) is given by $1/K\Sigma_k|h_k(r)|^2 \cong |h_o(r)|^2 + \sigma^2(r)$, where $\sigma^2$ is the variance of the random set $\{h_k(r)\}$ and is defined as $\sigma^2(r)=1/k\Sigma_k|h_k(r)-h_o(r)|^2$. Under the assumption of a weak scatterer, assume that this variance along r is much smaller than $\max_r |h_o(r)|^2$, but it is not negligible. Based on the above arguments, Eq. (4) becomes $$S(r_o) \cong |t(r_o)*h_o(r_o)|^2+|t(r_o)|^2*\sigma^2(r_o). \quad (5)$$

The first term of Eq. (5) is the desired diffraction-limited image given by Eq. (1). The second term is a convolution between the object and the variance functions. Clearly, $\sigma^2(r)$ is wider than $h_o(r)$ because the scattering layer broadens the diffraction-limited image of a point. Therefore, the second convolution in Eq. (5) blurs the diffraction-limited image of the object. The value of this blurring term is determined by the average value of the variance $\sigma^2(r)$. The contrast and the sharpness of the reconstructed object are inversely dependent on the variance.

To demonstrate the proposed technique, two binary objects were separately embedded between two layers of chicken breast separated from each other by a distance of 12 mm. One is a transparent object in the form of the letter V that measures 7 mm×11 mm, and the other is an opaque object in the form of a cross that measures 9 mm×9 mm. FIGS. 2(b) and 2(f) are the average pictures of the entire array when only layer $S_1$ exists in the setup and $S_2$ is removed. The thickness of rear tissue $S_1$ was approximately 3 mm in both experiments, whereas the thickness of front tissue $S_2$ was approximately 4 mm for the letter V and 8 mm for the cross object. A reduced scattering coefficient of the tissues of $\mu'_s=4.5\pm0.3$ cm$^{-1}$ was measured by the method proposed in L. Wang and S. L. Jacques, Appl. Opt. 34, 2362 (1995), incorporated by reference herein. Assuming the anisotropy factor is g=0.965, the scattering coefficient becomes $\mu_s=\mu'_s/(1-g)=128\pm9$ cm$^{-1}$. Rear tissue $S_1$ was illuminated by a collimated plane wave from a He-Ne laser of $\lambda=633$ nm. The MLA, placed a distance of d=155 mm from $S_2$, is composed of 115×100 hexagonal refractive lenses, but only the central 132 (12×11) lenses are used in these experiments. The radius of each microlens is $r_l=250$ μm, and their focal length is 3.3 mm. The material of the MLA is made of cured epoxy on a BK7 glass. The cured epoxy is transparent from 300-2800 nm and has thus w wider wavelength window than the BK7 material. Under these conditions, the optical system without the tissues can resolve a minimum size of $\lambda d/r_l=0.4$ mm. The image plane of the MLA is projected onto the CCD plane by a single spherical lens L, with a 300-mm focal length. Distances $Z_1$ and $Z_2$ shown in FIG. 1 are 520 and 710 mm, respectively. A digital CCD camera is used that measures 1280 pixels horizontally and 1024 pixels vertically within an 8.6×6.9 mm active area. The lens has a diameter of 30 cm and a focal length of 25 cm. The large lens and the multilens array work together to form an image of the object on the CCD chip of the camera. Actually not just one single image is formed on the CCD, but many images. Each microlens of the MLA will create an image of the object on the CCD chip. The parameters of the MLA are so that only light that is not scattered or light that is forward scattered will be used to make each image. Because of this the light that is scattered under larger angles is not going to be detected by the system. The parameters of the big lens, i.e., diameter and focal length, are chosen so that the images of all the lenses in the MLA are projected on the CCD chip.

The original object cannot be recognized from any image of the 132 different blurred images, several of which are shown in FIG. 2(c) for the letter V and in FIG. 2(g) for the cross object. Each blurred subimage of 96×84 pixels from the array was extracted from the matrix and shifted toward a common center. Two different strategies were used to center the blurred images, and both operated with success. One method was to calculated the center of gravity of each blurred cloud of the entire set of 132 blurred images. The center of gravity is considered the true center of the object in each frame, and accordingly all the images are centered to have the same center of gravity. In the second method, all the shifts needed in each picture are calibrated in advance by observing an object without front scattering layer $S_2$. The suitable shifts are those that led to a maximum overlap between all the images. The reconstruction results are shown in FIG. 2(d) for the letter V and in FIG. 2(h) for the cross. The original objects are recognized in both examples. The blurring of the original object predicted by Eq. (5) can also be seen clearly.

To verify that it is necessary to use coherent light, the system was imaged through the same scattering layer with incoherent light. FIG. 2(i) shows the image obtained without front layer $S_2$ under white-light illumination from a halogen lamp. When front layer $S_2$ is introduced into the system, the picture obtained in each channel is a wide blurry spot as shown in FIG. 2(j). In this case, the thickness of the rear slice is 3.5 mm and that of the front slice is 4 mm. All the pictures of the set seem to be more or less the same wide smoothly blurry spots shown in FIG. 2(k). Averaging over all 132 pictures yields the result shown in FIG. 2(l). The letter V cannot be recognized from FIG. 2(l). Incoherent light means that the object is illuminated by a large number of plane waves with many different angles. The effect on the output image in each channel is an accumulation of many blurred images of the object shifted randomly from the true object center. Therefore, the result in each imaging channel is a smoothly blurred unrecognizable image of the object. Accumulating these images along all the channels does not allow seeing through the scattering medium. Illuminating the medium with a broad spectral pointlike source, such as a superluminescent diode, may also yield a smooth blurred image in each channel due to dispersion resulting from the scattering layer.

In another experiment, the MLA was removed and the object imaged onto the CCD with a resolution that was 48 times better than that in the setup with the MLA. Then every successive rectangle of 48×48 pixels on the image matrix was averaged. The aim of this experiment was to verify that lateral averaging over a high-resolution image is not equivalent to averaging over many low-resolution images, as done in the experiment with the MLA. These results did not produce any recognizable image of the object. This shows that the procedure of averaging the low-resolution MLA images is significantly superior to averaging a single high-resolution image.

In summary, by the NOISE technique, it is possible to reconstruct the shape of binary objects embedded between two scattering layers. The weakness of the setup is the relatively low spatial bandwidth product of the diffraction-limited system. The use of a small aperture lens at each imaging channel reduces both the field of view and the system's bandwidth. However, this drawback seems a reasonable price to pay for the ability to image through a scattering medium in a simple and robust way. The advantages of the method are relative simplicity, low cost, fast operation, and the need for only low-power cw laser illumination. Because of all these advantages, NOISE may be useful for many imaging applications, such as in medical diagnostics.

In an alternative embodiment of the present invention, a different NOISE algorithm, NOISE 2, is used for recovering embedded objects. In contrast to the previous algorithm, there is no need to shift the speckled images toward a common center. The algorithm makes use of a point-source reference. In addition to the speckled images of the object, speckled images are recorded of a point-like object. After collecting all the object's speckled images by using the MLA, the point source is used to illuminate the setup, and speckled patterns of this point source, through the same number of channels, are captured by a CCD. Each subimage of the speckled object is placed side by side in the computer with a corresponding subimage of the speckled pointlike source, and the two images are jointly Fourier transformed. The squared magnitudes of the jointly transformed pictures are accumulated to compose a single average joint power spectrum. Object reconstruction is achieved by another Fourier transform (FT) of this average spectrum. As a result, the final image is close to a cross-correlation between the object function and a narrow pointlike source. With this technique, the relative locations between the speckle patterns do not have any influence on the result of the reconstruction. The method is based on the assumption that, in every channel, the object and the pointlike reference suffer from the same scattering. Therefore, they are both shifted by the same amount relative to other channels, but the mutual distances between the speckled images of the object and the pointlike reference in the entire channels are the same.

Referring again to FIG. 1, it is assumed that the exposed object (without scattering medium $S_2$ in front of it) seems approximately the same for each microlens. Let the function $f_k(x, y)$ represent the intensity of the kth speckled image of the same embedded object function $s(x, y)$. Function $r_k(x, y)$ stands for the kth intensity of the speckled image of the pointlike function approximated by Dirac delta function $\delta(x, y)$. Under coherent illumination, both functions $s(x, y)$ and $\delta(x, y)$ are convolved with a randomly speckled kth point-spread function (PSF), $h_k(x, y)$, as follows:

$$f_k(x, y) = |s(x, y) * h_k(x, y)|^2, \quad r_k(x, y) = |\delta(x, y) * h_k(x, y)|^2 = |h_k(x, y)|^2, \quad k=1, 2, \ldots, K, \quad (6)$$

where the asterisk stands for the operation of two-dimensional convolution and K is the total number of imaging channels. It is assumed that the scattering layer induces in each channel a random PSF $h_k(x, y)$ that satisfies the relation that the ensemble average over the entire array is $$\frac{1}{K}\sum_k h_k(x, y) \cong h_o(x, y), \quad (7)$$

where $h_o(x, y)$ is the diffraction-limited PSF in each channel, without the presence of scattering layer $S_2$.

In the computer, the reference and the object speckled images are combined such that both are situated in the same plane, separated by a distance (a, b) from each other. The accumulated intensity pattern of the entire K joint power spectrum is $$\begin{aligned}I(u, v) &= \frac{1}{K}\sum_k I_k(u, v) \\ &= \frac{1}{K}\sum_k |\mathfrak{I}_{2D}[f_k(x + x_k + a/2, y + y_k + b/2) + \\ &\quad r_k(x + x_k - a/2, y + y_k - b/2)]|^2 \\ &\approx \frac{1}{K}\sum_k |F_k(u, v)|^2 + |R_k(u, v)|^2 + \\ &\quad F_k*(u, v)R_k(u, v)\exp[-i2\pi(au + bv)] + \\ &\quad F_k(u, v)R_k*(u, v)\exp[i2\pi(au + bv)],\end{aligned} \quad (8)$$

where u and v are the spatial frequency coordinates; $\mathfrak{I}_{2D}$ denotes a two-dimensional FT operation; a superscript asterisk denotes a complex conjugate; $F_k$ and $R_k$ are the FTs of $f_k$ and $r_k$, respectively; and $(x_k, y_k)$ is the kth random shift that results from propagation of light through the kth portion of the scattering layer. Inasmuch as the light from the reference and the object suffers from the same scattering in each channel, it is shifted by the same distance in each kth channel. Therefore, the magnitude expression in Eq. (8) eliminates the linear phase factor that results from the shift $(x_k, y_k)$. Another FT of the expression of Eq. (8) yields the output function $$C_{out}(\xi, \eta) = \frac{1}{K}\sum_k [f_k(\xi, \eta) \otimes f_k(\xi, \eta) + r_k(\xi, \eta) \otimes r_k 10(\xi, \eta)] + \left[\frac{1}{K}\sum_k r_k(\xi, \eta) \otimes f_k(\xi, \eta)\right] *$$

$$\delta(\xi - a, \eta - b) + \left[\frac{1}{K}\sum_k f_k(\xi, \eta) \otimes r_k(\xi, \eta)\right] * \delta(\xi + a, \eta + b), \quad (9)$$

where $(\xi, \eta)$ are the coordinates of the output plane and o denotes correlation. It is clear from Eq. (9) that three spatially separated Fourier orders can be observed. The second and the third terms at points $(\pm a, \pm b)$ are of interest here; they correspond to the convolution between object $s(\epsilon, \eta)$ with narrow functions, as discussed below. Therefore one retrieves the object image by observing the pattern at the vicinity of the points (a, b) or (-a, -b).

The last term in Eq. (9) is expected to yield the reconstructed image at point (a, b). Substituting expressions (6) and (7) into the third term of Eq. (9) and following a straightforward algebra yield for the third term $$C_3(\xi - a, \eta - b) = \frac{1}{K}\sum_k |s(\xi, \eta) * h_k(\xi, \eta)|^2 \otimes |h_k(\xi, \eta)|^2 \cong \quad (10)$$

$$|s(\xi, \eta) * h_o(\xi, \eta)|^2 \otimes |h_o(\xi, \eta)|^2 +$$

$$\sigma^2(\xi, \eta) * |s(\xi, \eta)|^2 \otimes |h_o(\xi, \eta)|^2 +$$

$$\sigma^2(\xi, \eta) \otimes [|s(\xi, \eta) * h_o(\xi, \eta)|^2 + |s(\xi, \eta)|^2 * \sigma^2(\xi, \eta)]$$

The first term of expression (10) is the desired image of the embedded object. As can be seen from this term, one obtains the image by convolving object function $s(\xi, \eta)$ twice with the diffraction-limited PSF $h_o(\xi, \eta)$. Therefore, independently of the scattering, this imaging method has an inherent loss of resolution because of the double convolution with the PSF $h_o(\xi, \eta)$. The rest of the terms of expression (10) are a convolution between the object and the variance function $\sigma^2(\xi, \eta)$, defined as $\sigma^2 = (1/K)\Sigma_K |h_k - h_o|^2$. Clearly, $\sigma^2(\xi, \eta)$ is wider than $h_o(\xi, \eta)$, defined as scattering layer broadens the diffraction-limited image of a point. Therefore, the terms of convolution with the variance function in expression (10) blur the diffraction-limited image of the object. The value of these blurring terms is determined by the average value of the variance $\sigma^2(\xi, \eta)$.

The system shown in FIG. 1, with the method of point-source reference described above, was experimentally tested. A transparent object in the form of the letter V with a size of 7×11 mm was embedded between two scatatering layers of chicken breast tissue separated from each other by a distance of 12 mm. The thicknesses of the layers, back $S_1$ and front $S_2$, were ~3 and ~4 mm, respectively. The scattering coefficient value of the layers is the same as in Ref. 4.

Figure 3:
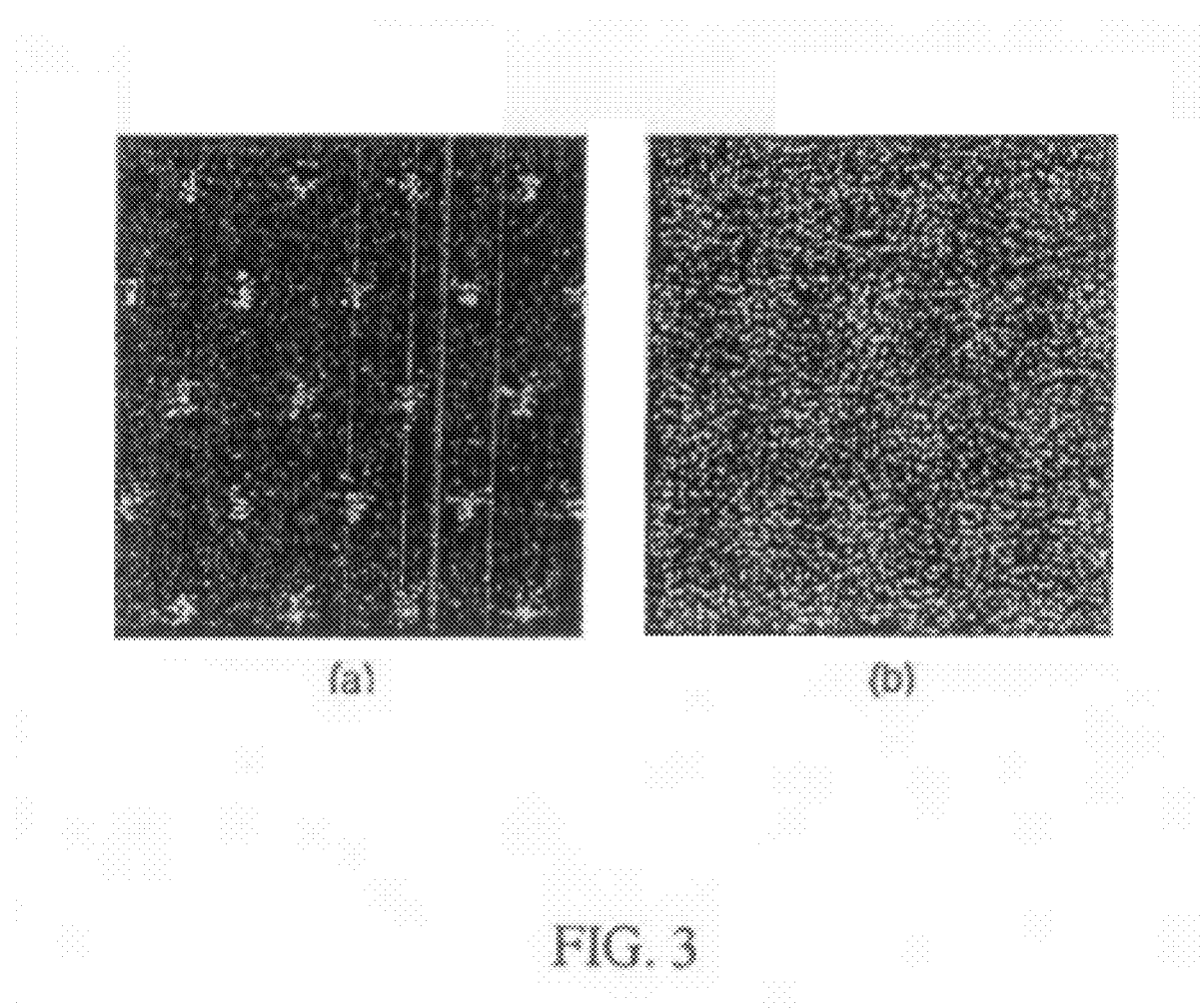
FIG. 3(a) illustrates 22 projections of 132 speckled images of a point-source reference.
FIG. 3(b) illustrates 22 projections of 132 speckled images of a V object.

Rear tissue $S_1$ was illuminated by the collimated beam of a 35 mW He-Ne laser with 632.8 nm wavelength. Speckle images were taken with the MLA placed a distance d=160 mm from the object. Used are 12×11=132 hexagonal refractive microlenses from the MLA in the experiment. The radius of each microlens was $r_1$=250 µm, and its focal length was 3.3 mm. Under these conditions the optical system without the tissues can resolve a minimum size of $\lambda d/r_1 \cong 0.4$ mm. The MLA image plane is then imaged by a single spherical lens, L, onto a CCD camera. The spherical lens with 300 mm focal length matches the MLA image plane onto the CCD. FIG. 3 shows several elemental images from among 132 speckled images of the point-source (FIG. 3(a)) and of the object (FIG. 3(b)), as recorded by the CCD.

Figure 4:
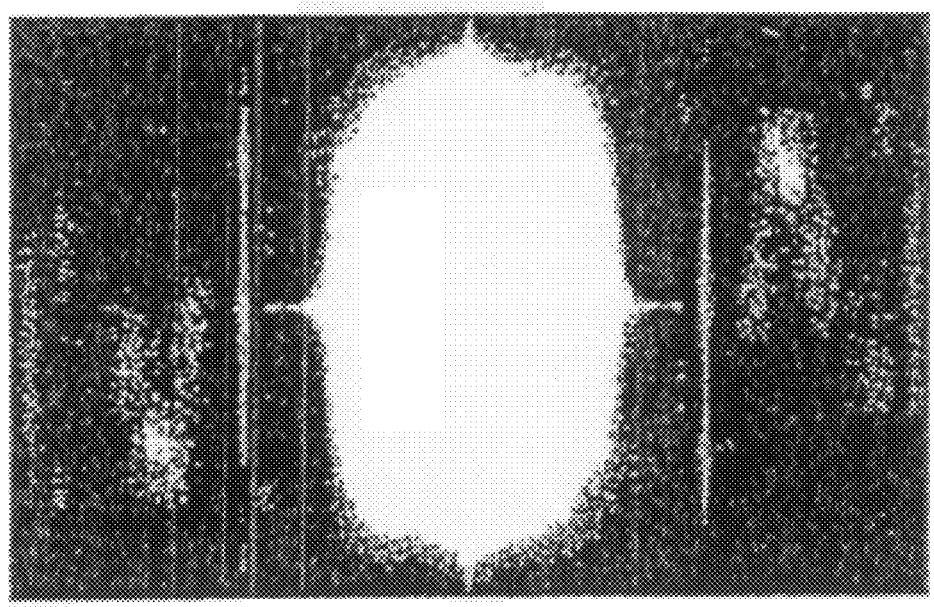
FIG. 4(a) illustrates experimental results of an embodiment of the present invention where a desired image of the observed object is recovered on both sidelobes.
FIG. 4(b) illustrates the left sidelobe from FIG. 4(a)
FIG. 4(c) illustrates an average picture of an entire array when the letter V is positioned in front of the scattering layer S, and scattering layer $S_2$ is removed.
FIG. 4(d) illustrates the recovered image of the letter V obtained by an algorithm in accordance with the present invention.
Figure 4:
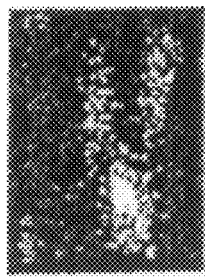
Figure 4:
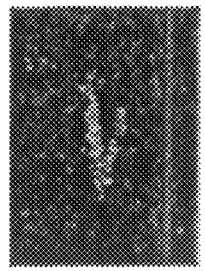
Figure 4:
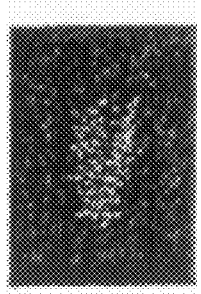

In the computer, each subimage of the array that originates from the object is combined with the corresponding subimage of the array that originates from the point source. The point source may be created by placing a pinhole attached to tissue $S_1$ from the side illuminated by the laser (plane wave). The pinhole is located a short distance behind layer $S_1$ and the object, which enables neglect of the mutual movement between the point and the object along the full angular range of ~2° of the MLA. Thus, from a practical point of view, the point source and the object are considered to reside at the same location in space. The light from the pin-hole goes through the object such that the embedded object does not need to be removed. Although this method becomes more complicated as a result of the double recording process, the increase of accuracy justifies its use. Each enlarged input plane, which contains the speckled point source beside the speckled object, is Fourier transformed. The squared magnitude of each channel's spectrum is accumulated with all the others. This average joint power spectrum is then Fourier transformed again to the output correlation plane. The three orders of the correlation plane that contain the revealed image of the object in two sidelobes are shown in FIG. 4(a). FIG. 4(b) shows the recovered image of the letter V taken from the left sidelobe of FIG. 4(a). For comparison, FIG. 4(c) shows the average image of the letter V without scattering layer $S_2$. The effect of extending the object in FIG. 4(b) in comparison to FIG. 4(c) can be clearly seen. This phenomenon is due to the double convolution with the PSF $h_o$ in (FIG. 4(b)), in contrast to a single convolution in FIG. 4(c). The image obtained by use of our version of the shift-and-add algorithm is depicted in FIG. 4(d). From comparison of FIGS. 4(b) and 4(d) it seems that imaging by cross correlation with a point reference (FIG. 4(b)) yields better resolution than imaging by the add-and-shift algorithm (FIG. 3(d)). The improvement in resolution is quantified by comparison of the depth of the notch between the sides of the letter V in the results. Measurements indicate that the notch in FIG. 4(b) is, on average, 30% deeper than the notch in FIG. 4(d).

In conclusion, disclosed is an alternative reconstruction algorithm for the recently proposed NOISE system. This algorithm obviates the need to shift every speckled pattern of the object to an estimated, and inaccurate, common center. Thus, one source of resolution reduction is eliminated by this algorithm. However, this method produces another source of low resolution because the output image is obtained as a double convolution of the object with the PSF of a single channel.

The two alternative algorithms described herein can be implemented in computer programs run within the computer coupled to the CCD camera (see FIG. 1).

Figure 5:
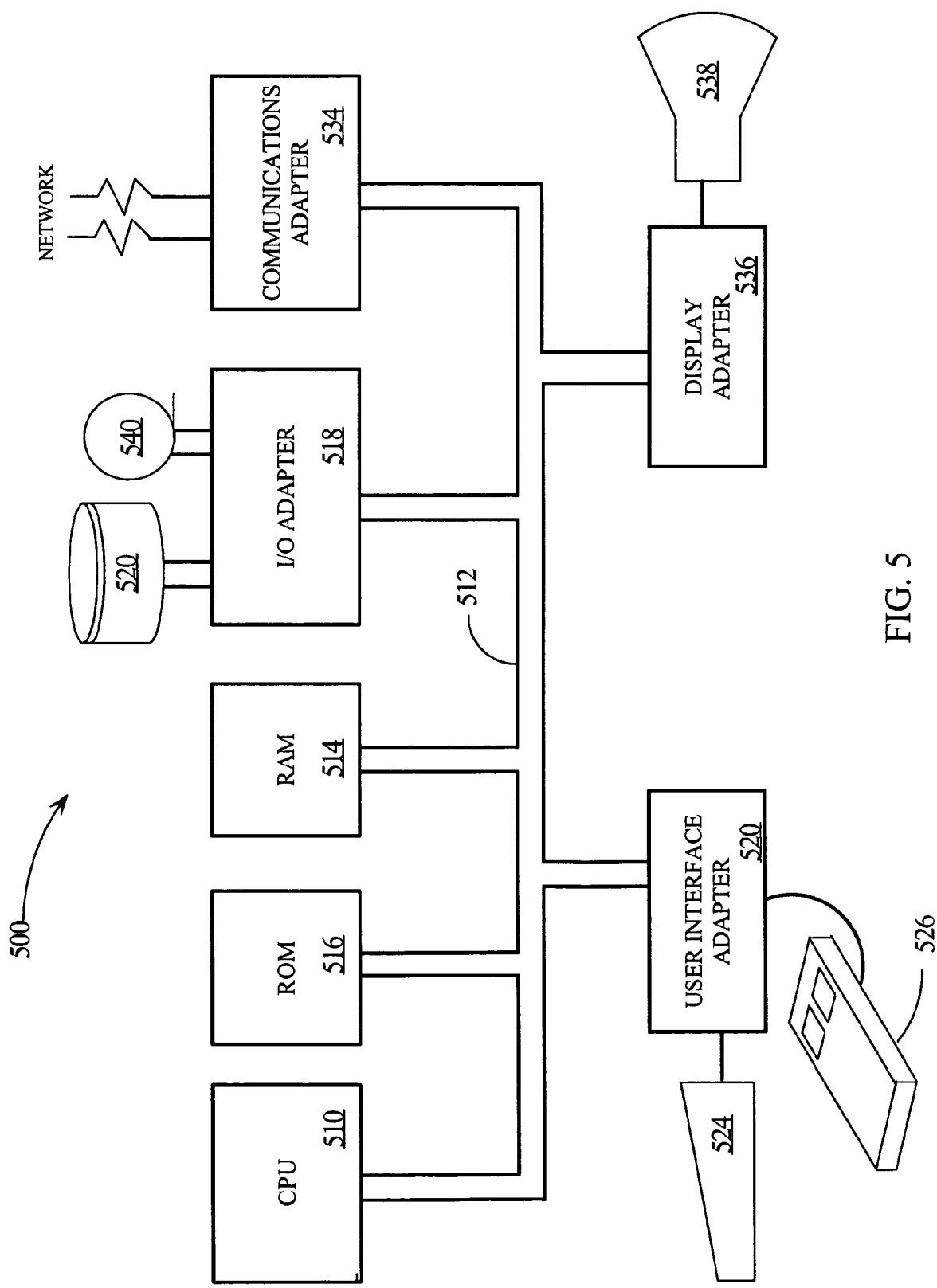
FIG. 5 illustrates a block diagram of the computer in FIG. 1.

Referring to FIG. 5, an example is shown of a data processing system 500 which may be used for the computer in FIG. 1. The system has a central processing unit (CPU) 510, which is coupled to various other components by system bus 512. Read only memory ("ROM") 516 is coupled to the system bus 512 and includes a basic input/output system ("BIOS") that controls certain basic functions of the data processing system 500. Random access memory ("RAM") 514, I/O adapter 518, and communications adapter 534 are also coupled to the system bus 512. I/O adapter 518 may be a small computer system interface ("SCSI") adapter that communicates with a disk storage device 520. Communications adapter 534 interconnects bus 512 with an outside network enabling the data processing system to communicate with other such systems. Input/Output devices are also connected to system bus 512 via user interface adapter 522 and display adapter 536. Keyboard 524, track ball 532, mouse 526 and speaker 528 are all interconnected to bus 512 via user interface adapter 522. Display monitor 538 is connected to system bus 512 by display adapter 536. In this manner, a user is capable of inputting to the system throughout the keyboard 524, trackball 532 or mouse 526 and receiving output from the system via speaker 528 and display 538.

Implementations of the invention include implementations as a computer system programmed to execute the method or methods described herein, and as a computer program product. According to the computer system implementation, sets of instructions for executing the method or methods (e.g., the algorithms described herein) may be resident in the random access memory 514 of one or more computer systems configured generally as described above. Until required by the computer system, the set of instructions may be stored as a computer program product in another computer memory, for example, in disk drive 520 (which may include a removable memory such as an optical disk or floppy disk for eventual use in the disk drive 520). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

What is claimed is:

1. A system for imaging an object hidden by a first scattering layer, comprising:
    a coherent light, source for emitting a plane wave;
    a microlens array positioned to receive scattered light produced from the plane wave as it illuminates the object hidden by the first scattering layer, the microlens array producing speckled images from the received scattered light; and
    a camera for collecting and storing the speckled images.

2. The system as recited in claim 1, wherein the object is hidden between the first scattering layer and a second scattering layer, wherein the planar wave is directed through both scattering layers towards the microlens array.

3. The system as recited in claim 1, further comprising a focusing lens positioned between the microlens array and the camera.

4. The system as recited in claim 1, wherein the camera comprises a charge-coupled device.

5. The system as recited in claim 1, further comprising a computer coupled to the camera for displaying an image of the object recreated from the speckled images collected by the camera.

6. The system as recited in claim 5, wherein the recreated image of the object is reconstructed by shifting the speckled images to a common center and accumulating the shifted speckled images into an average image.

7. The system as recited in claim 5, wherein the recreated image of the object is reconstructed by an algorithm operated as a computer program in the computer comprising the program steps of:
    (a) Fourier transforming such of the speckled images jointly with an image of a speckled pointlike light source;
    (b) accumulating a set of squared magnitudes images created by step (a) to form an averaged image; and
    (c) Fourier transforming the averaged image.

* * * * *